(12) United States Patent
Tooley et al.

(10) Patent No.: US 9,521,906 B2
(45) Date of Patent: Dec. 20, 2016

(54) MOUNTING, KIT AND METHOD FOR ASSEMBLING A MOUNTING AND MOUNTING FURNITURE TO A WALL

(75) Inventors: Jonathan Harry Tooley, Andover (GB); Peter James Harold Pegden, Sutton Park Hull (GB); Paul Edward Wills, Andover (GB)

(73) Assignee: Croydex Limited, Andover (GB)

( * ) Notice: Subject to any disclaimer, the term of this patent is extended or adjusted under 35 U.S.C. 154(b) by 426 days.

(21) Appl. No.: 13/816,612

(22) PCT Filed: Jul. 22, 2011

(86) PCT No.: PCT/GB2011/001100
§ 371 (c)(1),
(2), (4) Date: Mar. 22, 2013

(87) PCT Pub. No.: WO2012/020209
PCT Pub. Date: Feb. 16, 2012

(65) Prior Publication Data
US 2013/0181102 A1    Jul. 18, 2013

(30) Foreign Application Priority Data
Aug. 13, 2010 (GB) .................................. 1013660.4

(51) Int. Cl.
*A47G 1/17* (2006.01)
*A47B 96/06* (2006.01)
(Continued)

(52) U.S. Cl.
CPC ............... *A47B 96/06* (2013.01); *F16B 12/00* (2013.01); *F16B 11/006* (2013.01); *F16B 21/04* (2013.01);
(Continued)

(58) Field of Classification Search
CPC ........ A47B 96/06; F16B 12/00; F16B 11/006; F16B 21/04
(Continued)

(56) References Cited

U.S. PATENT DOCUMENTS 2,965,348 A    12/1960   Gerstel et al.
4,338,151 A *   7/1982   Hutter, III ........... B29C 65/7855
                                                    156/71
(Continued)

FOREIGN PATENT DOCUMENTS

AU       2010101472 A4    2/2011
DE   10 2008 058 389 A1   5/2010
(Continued)

*Primary Examiner* — Todd M Epps
(74) *Attorney, Agent, or Firm* — Blank Rome LLP

(57) ABSTRACT

The present invention provides a kit and a method for assembling a mounting (1) for mounting furniture to a wall. The kit comprises a mounting part (1) having a first component (2) having a first adhesive receiving portion with double sided adhesive foam applied thereto and a second component (3) having a second receiving portion (12). The first adhesive is chosen to develop a bond very quickly to the wall. The second adhesive forms a bond more slowly but is much stronger and provides the main force for supporting the item of furniture. The first component (2) and the second component (3) are releasably mountable with respect to one another. In another aspect, the second component (3) is provided with cruciform slots (10) which can alternatively be used to fix the component to a wall using screws.

50 Claims, 7 Drawing Sheets

(51) Int. Cl.
    *F16B 12/00*    (2006.01)
    *F16B 11/00*    (2006.01)
    *F16B 21/04*    (2006.01)
(52) U.S. Cl.
    CPC ....... *Y10T 29/49826* (2015.01); *Y10T 403/471* (2015.01); *Y10T 403/477* (2015.01)
(58) Field of Classification Search
    USPC .......... 248/205.3, 683, 467, 205.1; 156/578; 428/40
    See application file for complete search history.

(56) References Cited

U.S. PATENT DOCUMENTS

| | | | | |
|---|---|---|---|---|
| 4,398,647 A | * | 8/1983 | Ackerman | H01R 25/165 174/58 |
| 4,641,807 A | * | 2/1987 | Phillips | A47G 1/164 248/296.1 |
| 4,822,656 A | * | 4/1989 | Hutter, III | B29C 65/7855 156/247 |
| 4,842,912 A | * | 6/1989 | Hutter, III | B29C 65/02 156/247 |
| 4,932,805 A | * | 6/1990 | Mullen | B41J 29/02 403/13 |
| 5,065,489 A | * | 11/1991 | Mullen | B23Q 1/0063 29/281.5 |
| 5,402,977 A | * | 4/1995 | Korfgen | A47K 3/30 211/89.01 |
| 5,893,544 A | | 4/1999 | Chen | |
| 7,207,543 B2 | * | 4/2007 | Ortwein | F16B 11/006 156/578 |
| 2003/0035684 A1 | * | 2/2003 | Hutter, III | F16B 5/0208 403/267 |
| 2007/0102601 A1 | | 5/2007 | Thompson | |
| 2007/0210234 A1 | * | 9/2007 | Lin | A47G 1/162 248/475.1 |
| 2009/0206214 A1 | | 8/2009 | David | |
| 2010/0314511 A1 | | 12/2010 | Hutter, III | |

FOREIGN PATENT DOCUMENTS

| | | | | |
|---|---|---|---|---|
| DE | 10 2009 003 391 A1 | 7/2010 | | |
| FR | 2 503 430 A1 | 10/1982 | | |
| FR | 2503430 A1 | * 10/1982 | ............... | G09F 7/20 |
| WO | WO 96/15897 | * 5/1996 | | |
| WO | WO 96/15897 A1 | 5/1996 | | |
| WO | WO 2009/120455 A2 | 10/2009 | | |
| WO | WO 2010/002280 A1 | 1/2010 | | |

* cited by examiner

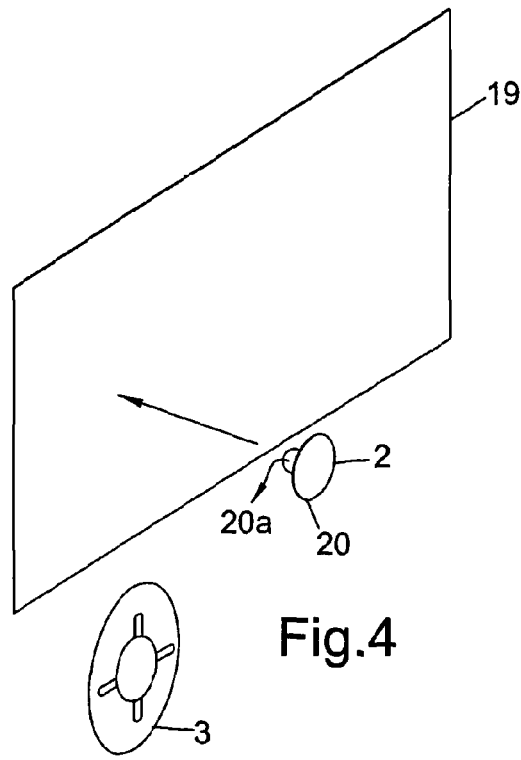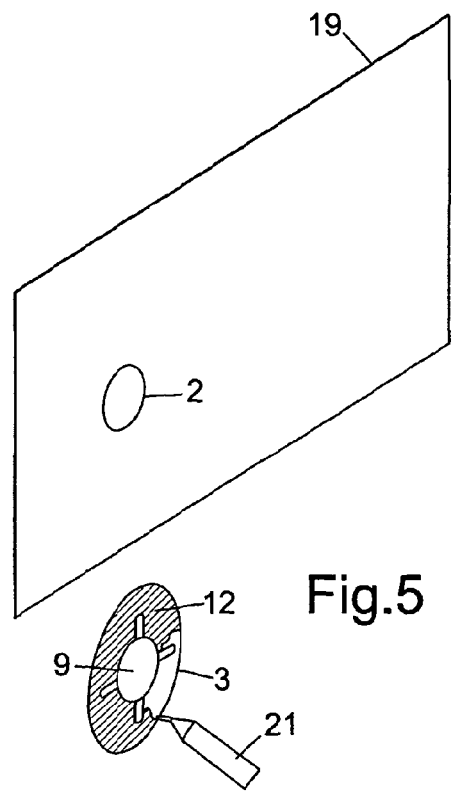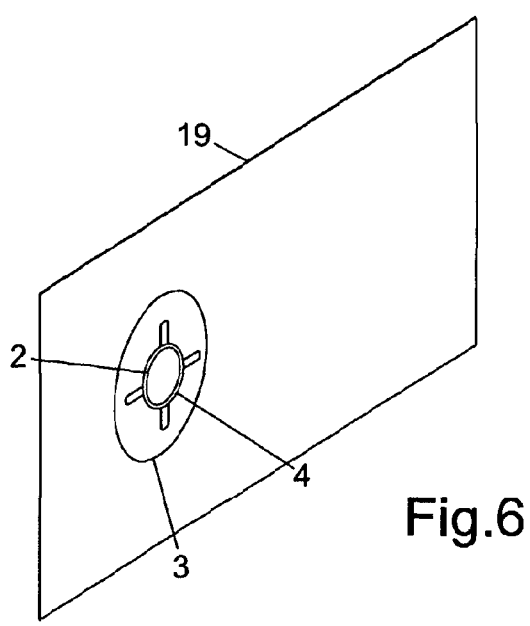

MOUNTING, KIT AND METHOD FOR ASSEMBLING A MOUNTING AND MOUNTING FURNITURE TO A WALL

The present invention relates to a kit for assembling a mounting for mounting furniture to a wall, a method for assembling a mounting for mounting furniture to a wall and a mounting assembled by using the kit or the method of the present invention.

The present invention also relates to another type of mounting for mounting furniture to a wall, and a method of mounting furniture to a wall.

Mountings for mounting furniture to a wall have been provided for many years, for example in the form of hooks or other mountings which can be screwed to a wall. U.S. Pat. No. 7,207,543 discloses a mounting system for fitting a fixing element to a wall, in which the element is not screwed to a wall, but fixed in place using adhesive. In order to allow a sufficiently strong bond to form between the mounting and the wall, an adhesive with a high bond efficiency has to be used.

The time taken for the adhesive to form a sufficiently strong bond can be quite long. It is desirable to design a mounting in such a way that it can be fixed to a wall using adhesive but held in position on the wall while the adhesive sets.

In a known variant of the mounting which is fixed to the wall by adhesive, temporary fixing of the mounting is obtained by providing a first adhesive and a second adhesive, the first adhesive developing a bond to a wall more quickly (and suitably instantaneously) than the second adhesive, so that the first adhesive can hold the mounting in place during the setting of the second adhesive (suitably a relatively slow setting but very strong adhesive).

When assembling furniture to a wall, care has to be exercised by the installer to ensure that the mounting is placed accurately, particularly when there are two mountings, so that the furniture will hang level.

The present inventors have realised that the mounting can be configured as two components which are releasably mounted with respect to one another, each having a respective adhesive receiving portion.

In this way, one of the components can be first assembled to a wall without having to place the entire mounting on the wall, which assists in the accurate setting up of the mounting. Further, if a first component has a first adhesive which develops a bond to the wall more quickly than the second adhesive, it can be used to hold the mounting securely in place while the second adhesive sets.

Accordingly, in a first aspect, the present invention provides a kit for assembling a mounting for mounting furniture to a wall, the kit comprising:
  a mounting part, having a first adhesive receiving portion having a first component, and
  a second component having a second adhesive receiving portion,
  a first adhesive for application to the first adhesive receiving portion,
  a second adhesive for application to the second adhesive receiving portion, wherein the first adhesive develops a bond to a wall more quickly than the second adhesive, and wherein the first component and the second component are releasably mountable with respect to one another.

The first aspect of the present invention further provides a method for assembling a mounting for mounting furniture to a wall, comprising the steps of:
  providing a mounting part having a first component having a first adhesive receiving portion, and a second component having a second adhesive receiving portion,
  applying a first adhesive to the first adhesive receiving portion,
  applying a second adhesive to the second adhesive receiving portion, and placing the mounting part on a wall, wherein the first adhesive develops a bond to the wall more quickly than the second adhesive and wherein the first component and the second component are measured with respect to one another.

The present invention further provides a mounting for mounting furniture to a wall, assembled using the kit of the invention or using the method of the invention.

The present inventors have also realised that, whereas a mounting may be chiefly intended for fixing to a wall by adhesive, there will be some cases where the user wishes to use a different means, for example, a screw. For example, some surfaces are not suitable for engagement using adhesive. Accordingly, it has been the practice to provide a screw hole in a fixing which can be used to additionally fix a mounting to a wall using a screw. Sometimes, a screw slot is provided. The present inventors have realised that this is particularly helpful if there is an already existing screw hole in the wall, as it allows the position of the screw with respect to the mounting to be adapted to the screw spacing.

The present inventors have realised that in some cases, it is valuable not only to be able to adjust the screw spacing in a horizontal direction, but also in a vertical direction, for example if existing screw holes were not made truly level.

Accordingly, in a second aspect of the present invention, there is provided a mounting for mounting furniture to a wall, comprising a mounting part for engaging the furniture and for fixing to a wall, the mounting part having:
  (a) at least two screw slots crossing or touching one another at an angle, for receiving at least one screw for fixing to a wall; or
  (b) at least one screw slot and at least one separate screw slot or fixed screw hole, for receiving at least one screw for fixing to a wall; or
  (c) at least one curved screw slot.

The arrangements (a), (b) and (c) above, for example, screw slots crossing one another at an angle, are found to provide an adaptable and easily used variable position for a screw with respect to the mounting part which allows the mounting part to be placed in the correct position even if the screw hole in the wall has a different alignment or position in either the horizontal or vertical direction to the desired position of the mounting part.

The second aspect of the invention further provides a method of mounting furniture to a wall, having an already existing screw hole, comprising fixing to a wall a mounting part having at least two screw slots crossing or touching one another at an angle, or having at least one screw slot and at least one separate screw slot or fixed screw hole, by screwing a screw through at least one screw slot or screw hole into the existing screw hole, and mounting the furniture on the mounting part.

Preferred and optional features of the present invention will be described further below.

Unless explicitly stated, the general comments set out below apply to either aspect of the invention.

The present invention can be used to mount furniture of any suitable form to a wall.

For example, it may be used to mount shelving, a shower rail, a shower curtain rod, a soap dish, a toilet roll holder, a towel holder, a wire basket, a bracket, a shelf comprising at least one bracket, a mirror, a picture, a container such as a cupboard or any other furniture to a wall. Suitably, the present invention can provide a mounting for bearing a weight which may be up to 50 kg, being preferably up to 30 kg, more preferably up to 20 kg. The 'furniture' to be mounted may be any wall mounted item, particularly one which is visible in use. The furniture may comprise at least one straight edge to assist the user in level mounting.

The mounting part may have any suitable form for engaging the furniture. For example, it may comprise a structure engageable with a corresponding structure formed on the furniture. The furniture may for example be held in position on the mounting part by the weight of the furniture causing respective engagement portions on the mounting part and the furniture to engage securely with one another. The furniture may be fixed permanently to the mounting part. For example, it may be integral with it. A releasable fixing may be provided, for example a screw or nut and bolt arrangement securing the mounting and the furniture.

In a further embodiment, the furniture comprises a formation which corresponds in internal configuration to the external configuration of the mounting part. In this way, the furniture can be held on the mounting part by fitting over the mounting part. It can be fixed in place by a fixing device, for example a screw or nut and bolt arrangement, for example a grub screw. The angle between the mounting part and the furniture may be variable. This is found to provide a particularly secure mounting for the furniture. Also, the mounting part itself is not visible when the furniture is assembled, which contributes to a desirable aesthetic appearance.

Suitably, the mounting part has a circular, or part circular plan. In this respect, the plan denotes the view which, in use, is normal to a wall to which the mounting part is fixed.

By providing a circular or part circular plan, the mounting part can have surfaces for engaging the furniture which can allow a variable angle between the furniture and the mounting part. As will be explained further below, this can provide more flexibility in assembly of the furniture to the wall.

Preferably, the furniture comprises a formation with a corresponding circular or part circular internal profile which corresponds to the circular or part circular external profile of the mounting part, and permitting angular variation between the mounting part and the furniture. The formation on the furniture may for example comprise a recess formed in a rear face of the furniture.

According to the first aspect of the invention, the mounting is preferably engageable with the furniture and, according to the second aspect of the invention, the mounting part is required to be engageable with the furniture, in the sense that the mounting part engages the furniture directly. That is, there is no intervening mechanism between the mounting part and the furniture. In this way, a very simple and reliable mounting of furniture can be obtained. A relatively small structure can be used for mounting furniture to a wall. Complex mechanisms are not required.

It is particularly preferred that the mounting part of the second aspect comprises either a unitary mounting part, formed of an integral part and to which the furniture is directly mounted or it may comprise more than one part, the parts of the mounting part being substantially fixed or fixable with respect to one another. Preferably, the structure of the mounting part which is fixed to the wall is integral with the part of the mounting part which engages the furniture or is fixed or fixable with respect to the part of the mounting part which engages the furniture.

The present invention can be used to mount furniture to many kinds of wall, for example being suited for use on walls which have been painted, finished with wallpaper, covered with tiles, formed of glass or any other similar material. The wall may be smooth or relatively rough. If the surface of the wall is rough, more adhesive may be required.

The mounting part may be formed of any suitable material, for example metal (for example die cast or pressed metal) such as zinc, steel, aluminium or any other suitable metal, synthetic polymeric material such as thermoplastic (suitably formed by injection moulding) or composite material.

The first and second adhesive receiving portions each suitably comprise a surface area which, when provided with adhesive and fixed to a wall, will provide sufficient bond area to support the weight of the furniture. The first and second adhesive receiving portions may be textured or provided with formations to improve the bond. For example, they may be formed with ridges, with indentations, with a matte surface, with a stippled surface or any other suitable form. Preferably, the texture or formations increase the contact surface area between the second adhesive surface and the second adhesive compared to a flat surface of the same overall area. In accordance with normal practice, the space for containing the first and second adhesive may, when the mounting part is placed against the wall, be relatively thin (for example of the order of 0.5 mm to 2 mm, more preferably 1.0-1.5 mm) in order to form a strong bond. The first component is suitably configured so that, when it is engaged with a wall, with the thickness of the first adhesive (for example, an adhesive pad), the first component holds the second component at a distance in the range 0.5 mm to 2 mm, more preferably 1.0-1.5 mm, from the wall.

The mounting part according to the first aspect of the present invention comprises a first component and a second component. The first and second components may be formed of the same material as one another or different materials. According to the kit of the first aspect of the invention, they are releasably mountable with respect to one another. In this way, the first component can be placed on a wall and, subsequently, the second component can be mounted on the first component, the first component thereby holding the second component in a desired position. It should be noted that, in the method of the present invention, the first and second components are, as supplied, releasably mountable with respect to one another, though when the adhesive has set, they will not necessarily be releasable, as they may be held in position by the first or second adhesive.

The first component may advantageously be smaller than the second component. It may be substantially smaller. For example, the maximum dimension may be between 0.5 and 0.1, more preferably 0.5 and 0.2 of the maximum dimension of the second component. This will make the first component very easy to place in position accurately. It will be easily manipulated and may be relatively light.

The overall dimensions of the mounting part may be of the order of 2-20 cm, more preferably 3-10 cm.

Preferably, the first component is mountable in an opening or recess of the second component. It is also possible that the second component is mountable in an opening or recess of the first component and the description below will apply equally to this arrangement. However, it is preferred that the first component is mountable in an opening or recess of the second component.

This will allow the first component to hold the second component in a desired position relatively securely. In a particularly preferred embodiment, the second component has a first side for placing adjacent to the wall and a second side for facing away from the wall, the first component being mountable in an opening or recess of the second component which extends from the first side to the second side. The second component may then be placed over the first component in such a way that a part of the first component projects through the second component. This means that, when the first and second components are mounted to one another, a user will still be able to manipulate both components. The part of the first component which projects through the second component can be used to fix the components together, as will be described further below.

The opening or recess may be enclosed on all sides by the second component (being in the form of a hole). Alternatively, it may comprise an indentation in an external contour of the second component.

In a preferred embodiment, the first component is configured to be releasably fixed with respect to the second component at a selectable position. In particular, the first component is preferably releasably fixed with respect to the second component at a selectable position away from the wall. This allows the user to set the position of the first component and second component with respect to one another, even if the wall is uneven or rough, to obtain the optimum spread of second adhesive.

Preferably, the first component and the second component can be releasably fixed together in such a way that the first component holds the second component against a wall under compression. In this way, the second adhesive can be pressed against the wall by the first component acting through the second component, to develop a strong bond.

A way in which this can be particularly preferably achieved is by the use of a cam member having a cam surface, at least one of the first and second components also having a cam surface, whereby movement of the cam surfaces with respect to one another will position the first and second components at a selectable position. Optionally, movement of the cam surfaces with respect to one another will also allow a certain amount of compression to be applied by the first component to the second component. Preferably, the cam member is separate from the first and second components. In detail, the cam member preferably comprises a bearing surface in addition to the cam surface and the other of the first and second components has a corresponding bearing surface. Then, the cam member can position the first and second components with respect to one another by engagement of the cam surfaces and bearing surfaces. In particular, the first component may be fixed to the wall by a first adhesive, the first component will then have either a bearing surface or a cam surface (or both) and the cam member will have a corresponding bearing surface or cam surface for engaging the first member and a bearing surface or cam surface for engaging the second member which has a corresponding bearing surface or cam surface.

It is particularly preferred that the cam member is rotatable with respect to the first and second components, as this allows strong and even compression to be applied in a manner which is easy to use.

The bearing surfaces may themselves be in the form of additional cam surfaces.

The cam surfaces may comprise screw threads.

In a preferred embodiment, the second component has a first side for placing adjacent to the wall and a second side for facing away from the wall, the first component being mountable in an opening of the second component which extends from the first side to the second side and the cam member is located adjacent the second side. In this way, the cam member can engage a part of the first component which projects through the opening of the second component and can be used to fix it with respect to or apply compression to the second side of the second component.

Preferably, the first component is mounted with respect to the second component so that they do not rotate with respect to one another. This allows a rotatable cam to be used without the concern that rotation of the cam will accidentally rotate one or other of the first and second components, preventing fixing or application of compression.

The first adhesive may be any suitable adhesive material which develops a bond relatively quickly to a wall. Preferably, the first adhesive develops a bond substantially instantaneously upon contact with a wall.

The first adhesive develops a bond to a wall more quickly than the second adhesive. In general, this will be true for more or less any wall material. Nonetheless, for test purposes, it is preferred that the first adhesive develops a bond between a glazed tile and a plastic (e.g. ABS resin) surface of a given size than the second adhesive.

It is particularly convenient for the first adhesive to be provided in the form of an adhesive sheet material, particularly preferably a double sided adhesive sheet material. Preferably, the first adhesive receiving portion comprises a surface for bonding to one side of the double sided adhesive material. The double sided adhesive sheet material may be supplied already bonded to the surface of the first adhesive receiving portion on one side, the other side of the double sided adhesive sheet having a peel-off sheet, for example in the form of a conventional protective layer. In this way, the user can very easily select a position for the first component, peel off the protective layer and apply the first component to the wall in the selected position. Alternatively, the double sided adhesive sheet material may be supplied separately, with peel-off sheets on both surfaces. A plurality of sheets may be provided with one mounting part, so that it can be reused or repositioned with a new adhesive pad each time.

The adhesive sheet material preferably comprises a foam layer, which will allow tension between the wall surface and the first component. It will also allow minor irregularities in the wall to be accommodated.

The adhesive material itself preferably comprises acrylic adhesive.

The second adhesive may comprise any suitable adhesive composition. Preferably it is one that forms a strong bond. It may comprise a single component adhesive or a two component adhesive. It may be a polyurethane.

The second adhesive may be suitably supplied as a flowable composition in a container, for application to the second adhesive receiving portion. In use, it is preferably applied by the user to the second adhesive receiving portion, suitably before the second component is applied to the wall. In this way, a user can spread the adhesive carefully over the respective second adhesive receiving portion to ensure a good coverage for a strong bond, and can select the amount applied depending on the surface.

The mounting part of the first aspect of the invention may comprise at least one screw hole or screw slot for receiving a screw fixing to a wall. In the second aspect of the invention, various configurations of screw slot or screw hole can be provided. In some cases, the wall will not be suitable for adhesive or there may already be a screw hole in position which can be reused. The screw hole or screw slot will allow screw fixing to be selected if appropriate. More than one screw can be engaged with a screw slot if appropriate. A screw slot will allow the position of the mounting part with respect to the screw hole to be varied. This can allow the position on the wall of the mounting part to be determined by the user and not absolutely fixed by the position of a pre-existing screw hole. For example, if two mountings are required for an item of furniture and there are two existing screw holes whose separation is slightly different from the optimum positions of the mountings for the new item of furniture, the screw slot can allow the mounting parts to be moved with respect to one another to a certain extent whilst using the existing screw holes.

The second aspect of the invention provides a number of configurations of screw slot and screw hole. These may also optionally be present in a mounting part of the first aspect of the invention. Each of the configurations provided by the second aspect of the invention provides the user with a wide range of variability of position of a screw with respect to the mounting. In each case, substantial adjustments in two dimensions parallel to a wall can be obtained. This can be particularly valuable if existing screw holes are to be used which are not precisely level with one another.

The mounting part may be fixed to a wall using just one screw or a plurality of screws, for example two screws. The screw slot and, if present, the screw hole will have a width sufficient to allow a screw shank to pass through but not to allow a screw head to pass through, so that the screw head bears on the mounting part when fixed.

The variability in position of the screw with respect to the mounting part is particularly useful if there are at least two screws and an already existing screw hole. If, for some reason, the already existing screw hole is not appropriately vertically or horizontally aligned, the mounting part can be repositioned so that one slot or one part of a slot is in position over the existing screw hole and another slot or another part of the slot is in position over another already existing screw hole or at a position which is deemed suitable for creating a new screw hole.

In this respect, it is particularly valuable that the mounting part should be circular or at least partly circular in plan. In this way, the mounting part can engage the furniture with a variable angle. It is found that, to obtain the full benefit of the different configurations of screw provided by the screw slots and screw holes of the second aspect of the invention, it is valuable to be able to twist or rotate the mounting part. However, the user will not want to rotate the furniture, so a variable angle engagement between furniture and mounting part is particularly valuable.

The provision of at least two screw slots crossing (which includes touching) one another substantially at a right angle is advantageous. It provides a simple way of allowing the user to select appropriate positions for inserting screws, which can be strong.

Other configurations may be used. The second aspect of the invention provides (i) a pattern of screw slots, (ii) a curved screw slot or (iii) a pattern of a screw slot and a screw hole that extends in each case in two dimensions.

Three screw slot sections meeting one another at a point may be provided.

A configuration resembling an anchor or a T may be provided. In this case, there is preferably a first screw slot section which meets a straight or curved second screw slot section, preferably substantially at a right angle. Preferably, the second screw slot section is curved. Preferably it describes a section of circular arc. Suitably, it extends over an angular range of from 90-180°.

Similarly, a straight or curved screw slot may be provided, in conjunction with a fixed screw hole. In this case, the screw hole is fixed with respect to the screw slot in the sense that it is in a part of the mounting part that does not move with respect to the screw slot, being integral with or fixed or fixable with respect to the part that has the screw slot.

Preferably, the screw hole is substantially diametrically opposed to a central part of the screw slot. Preferably, in this case, the screw slot comprises a section of arc, preferably a section of circular arc. Preferably, the mounting part is circular in plan and the circular arc is concentric with the mounting part.

In the case (c) where there is a curved screw slot, it preferably extends over an angular range of at least 270° and more preferably up to at least 300°. It may be of spiral configuration. Preferably, the mounting part is circular in plan and the curved slot is generally spiral, centred on the centre of the mounting part.

In an alternative embodiment, a straight or curved screw slot may extend in a central region of the mounting part, at least one screw hole being provided adjacent an edge of the mounting part. The screw hole may be completely surrounded by the mounting part or it may be in the form of a notch extending inwardly from a perimeter of the mounting part.

In an alternative embodiment, there may be a plurality of screw holes, preferably at least two and more preferably at least four screw holes. They may be arranged in any suitable pattern. For example, they may extend in a line or at the corners of a geometric figure, such as a square or triangle. More than one screw slot may be provided, for example, there are preferably at least two screw slots and there may be four screw slots. There may be a plurality of screw slots which are aligned with one another.

A plurality of screw slots which extend substantially parallel to one another may be provided. Any combination of a plurality of screw slots and a plurality of screw holes may be provided.

In all of these cases, the mounting part may comprise an aperture for receiving a component of the mounting. In particular, the mounting may be according to the first aspect of the invention.

Preferably, where there is at least one screw slot and at least one separate screw slot or screw hole, the distance between the part of the screw slot and the part of the separate screw slot or screw hole that are furthest from each other is in the range 10 mm-50 mm. That is, the furthest that a user may engage two screws with the same mounting part is preferably in the range 10 mm-50 mm, preferably 15 mm-35 mm.

If the parts are closer together than 10 mm, the range of adjustment which is available to the mounting is found to be insufficient for providing a wide range of use of the mounting. If the separation exceeds 50 mm, the mounting can become too large and complex to use. The distances represent the distances between the centres of screws engaged with the respective slot or hole.

Similarly, where there is at least one curved slot, at least one end of the curved slot may be separated from another part of the slot by a distance in the range 20 mm-50 mm. This may be the distance between the opposite ends of the slot. However, where the slot extends through a substantial section of arc, it may be the distance between at least one end of the slot and that part of the slot which is furthest from the end. For example, it may be a part of the slot which is diametrically opposite to the respective end of the slot.

In the method according to the second aspect of the invention, an already existing screw hole is used. By "already existing screw hole" it is meant a screw hole which already exists for a different purpose than mounting the mounting in question. It will not have been made as part of the same operation as mounting the furniture. For example, it may have been formed more than a day before, preferably more than a week before. For example, it may have been used to mount a different item of furniture in the past. Although it may not be necessary to provide a new screw hole, it is sometimes necessary to provide an additional screw hole or maybe to enlarge an existing screw hole. The second aspect of the invention nevertheless reduces the amount of additional screw holes which have to be formed, contributing the long term stability of the surface into which objects are mounted and reducing the amount of effort required.

According to the second aspect of the invention, a screw is screwed through at least one screw slot or screw hole. Preferably, the mounting part is placed over the existing screw hole and the screw is subsequently engaged with the screw slot or screw hole.

The screw is used to fix the mounting part to the wall. In this respect, the word "fix" is used to indicate that the screw exerts compression, suitably through the screw head, on the mounting part, to hold it against the wall. The mounting part is held under compressive forces between the wall and the screw head.

It should be noted that this is different to the case where a screw is screwed into a wall and an item is suspended on the screw.

Preferably, the compression provided by the screw provides all or at least part of the force required to hold the mounting part in position on the wall. Additional screws or adhesive may be used to supplement the compression provided by the screw.

In the first or second aspect of the invention, at least two mounting parts are preferably used. This provides an extremely flexible way of mounting an item of furniture stably to a wall. According to the second aspect of the invention, because of the geometry of the slot and screw hole provided in at least one of the mounting parts, the desired spacing and configuration of the mounting parts can be obtained even when using an existing screw hole and when using two separate mounting parts. Preferably, at least one of the mounting parts is placed or fixed in a first step, the position of a second mounting part being adjusted in a second step before it is fixed in a final step. For example, a user may hold the second mounting part in place or light pressure may be applied using a screw but under conditions in which it is still possible to move the position of the mounting part. The appropriate positioning of the mounting parts can then be obtained, for example by measurement or by use of a spirit level before the screw is tightened to fix the mounting part in place.

The second aspect of the invention may also be supplied in kit form. The kit may comprise at least one mounting part, and at least one screw. It may comprise more than one screw. It may comprise more than one mounting part. The kit may also comprise adhesive. The kit may comprise first and second adhesives, as described in relation to the first aspect of the invention. The kit may also comprise an item of furniture to be mounted using the mounting or mounting parts.

In one embodiment, the position or configuration in which the mounting part or mounting parts engage or engages the item of furniture may be variable. For example, the mounting part may be rotatable with respect to a part of the item of furniture to which it is engaged.

The kit may further comprise means for fixing the furniture to the mounting, for example a grub screw. The kit may further comprise conventional devices for enhancing the bond of a screw to a screw hole, for example a screw plug.

It is particularly preferred that the second component has a first side for placing adjacent to the wall and a second side for facing away from the wall, the first component being mountable in an opening which extends from the first side to the second side, the opening being coincident with at least one screw hole or slot and particularly preferably, the crossing region of two slots.

This means that the number of openings in the second component can be reduced, which can be advantageous. The slots can give a certain amount of flexibility to the material of the second component at the point at which it is engaged with the first component, which can be beneficial in employing compression to the second component.

In the second aspect of the invention many features of the first aspects of the invention can also be present.

The first aspect of the invention may be used to mount one mounting on a wall and the second aspect may be used to mount a second mounting, for mounting a single item of furniture.

The method of the invention can comprise using a kit of the invention. The method of the invention can include the step of selecting whether to use adhesive or a screw to fix the mounting part to the wall.

The present invention will be described further below by way of example only, with reference to the accompanying drawings, in which:

BRIEF DESCRIPTION OF DRAWINGS

FIGS. 4, 5, 6 and 7 show steps in the method of the present invention.

DETAILED DESCRIPTION OF DRAWINGS

Figure 1:
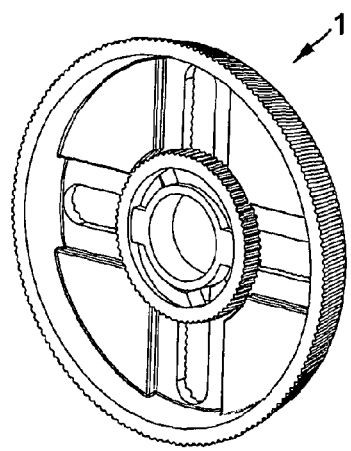
FIG. 1 is an isometric view of a first embodiment of a mounting part for use in the kit or method of the first aspect of the invention and as a mounting according to the second aspect of the invention.

FIG. 1 is a schematic front view of a first embodiment of a mounting part 1 according to the first aspect of the invention and the second aspect of the invention.

It will be supplied according to the first aspect of the invention as a kit, the kit further comprising a double sided adhesive foam patch 20 (see FIG. 4) and a second adhesive in the form of a liquid or gel composition which is contained in a tube 21 (see FIG. 5).

Figure 2:
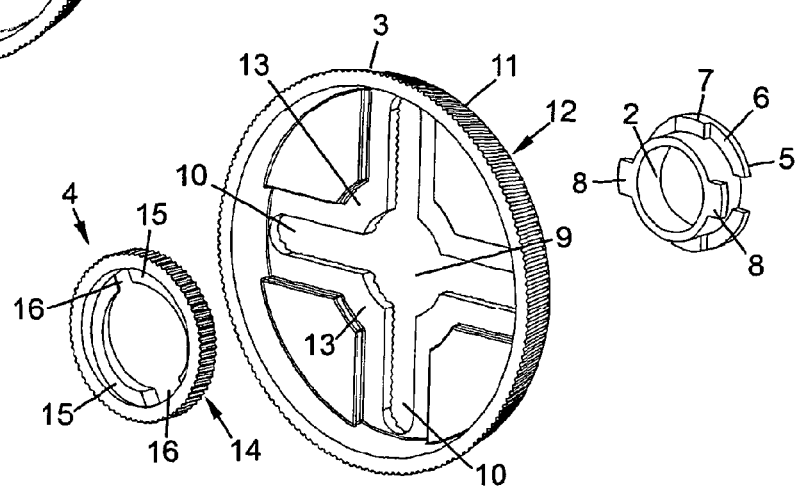
FIG. 2 is a view showing the components of the mounting part of FIG. 1.
Figure 2A:
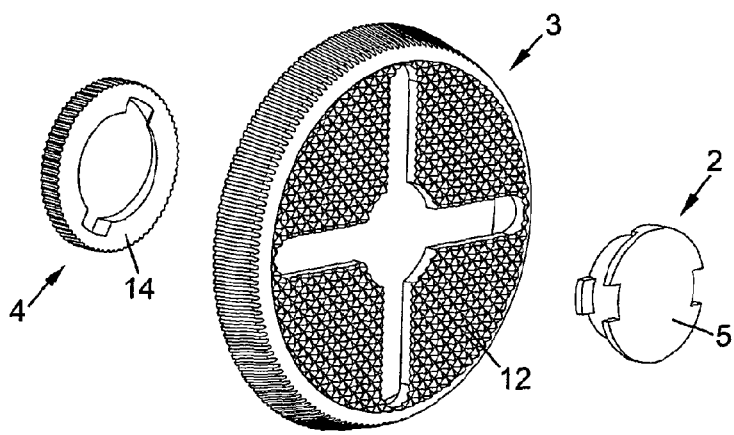
FIG. 2a shows a view of the components of FIG. 2 from the rear side.

As shown in FIG. 2, the mounting part comprises a first component 2 which has a first adhesive receiving portion indicated at 5 (and located on the rear side compared to the view shown in FIG. 2) to which the double sided adhesive foam patch 20 is adhered. There is a second component 3 which also has a second adhesive receiving portion (designated 12 and located on the opposite side to the view shown in FIG. 2). There is also a cam member 4 which will be described further below. FIG. 2a shows a view of the components of FIG. 2 from the rear side. The first adhesive receiving surface 5 can be seen. The second component is circular in plan.

The first component 2 comprises a short closed cylinder, suitably formed of injection moulded thermoplastic material. The first component 2 comprises an integrally moulded projecting collar 6 which, in use, bears against the rear surface 12 of the second component, causing it to be spaced by a certain minimum distance from a wall. A projection 7 is formed at each of two opposed positions. This projection engages in cruciform slots 10 which will be described further below, to prevent the first component rotating with respect to the second component. The first component also comprises a pair of cam surfaces 8 whose function will be described below. As can be seen form FIG. 2a, the first side 12 of the second component 2 is suitably textured to improve the bond to the second adhesive.

It can be seen that the second component 3 is in the form of a roughly disk shaped, relatively flat plate, having a first side 12 for placing adjacent a wall and a second side for facing away from the wall. The first component 2 is mountable in an opening 9 which is located at the point of intersection of two slots 10. The opening 9 extends from the first side 12 to the second side. A bearing surface 13 is defined around the periphery of the opening 9 and its function will be described further below.

The second component 3 is suitably formed of a die cast zinc material.

The cam member 4 is in the form of an annular ring with a knurled outside to enhance grip. It comprises a pair of cam surfaces 15 separated by slots 16. In use, the first component 2 is mounted on the wall as will be described further below. The second component, after having a second adhesive applied thereto (described further below) is inserted over the first component so that the projections 7 are put in respective slots 10 and so that the cam surfaces 8 are accessible from the second side of the second component. The cam member 4 is then passed over the exposed end of the first component 2, by passing the slots 16 over the cam surfaces 8. If the cam member 4 is then rotated, its cam surfaces 15 wedge between the cam surfaces 8 of the first component 2 and the bearing surfaces 13 of the second component 3. As the cam member is rotated, a compressive force is applied by the first component (which is fixed on the wall), through the cam surface 15 and the bearing surface 14 of the cam member to the bearing surfaces 13 of the second component so that the second component is pressed against the wall.

Figure 3:
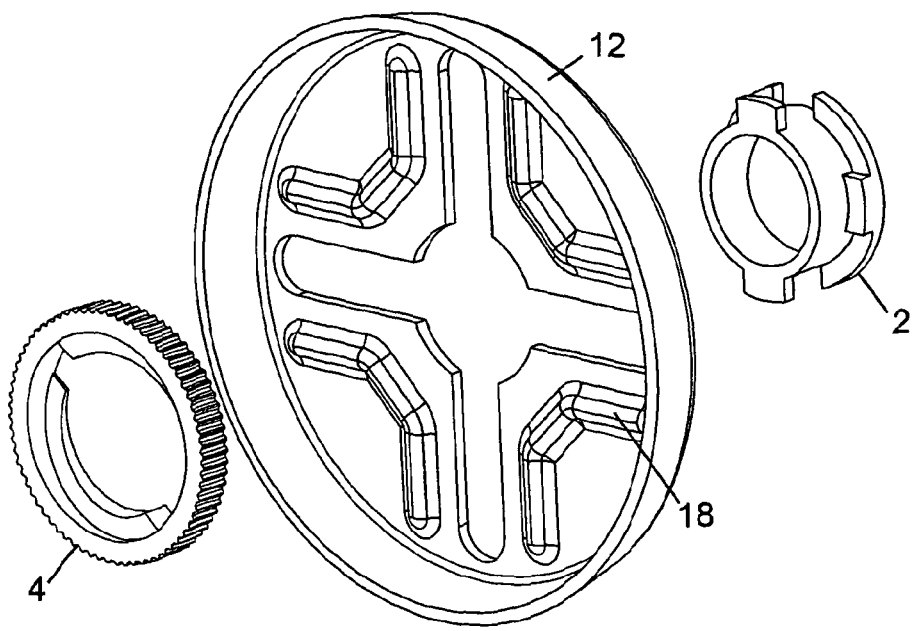
FIG. 3 is an isometric view of the components of a mounting part according to a second embodiment.
Figure 3A:
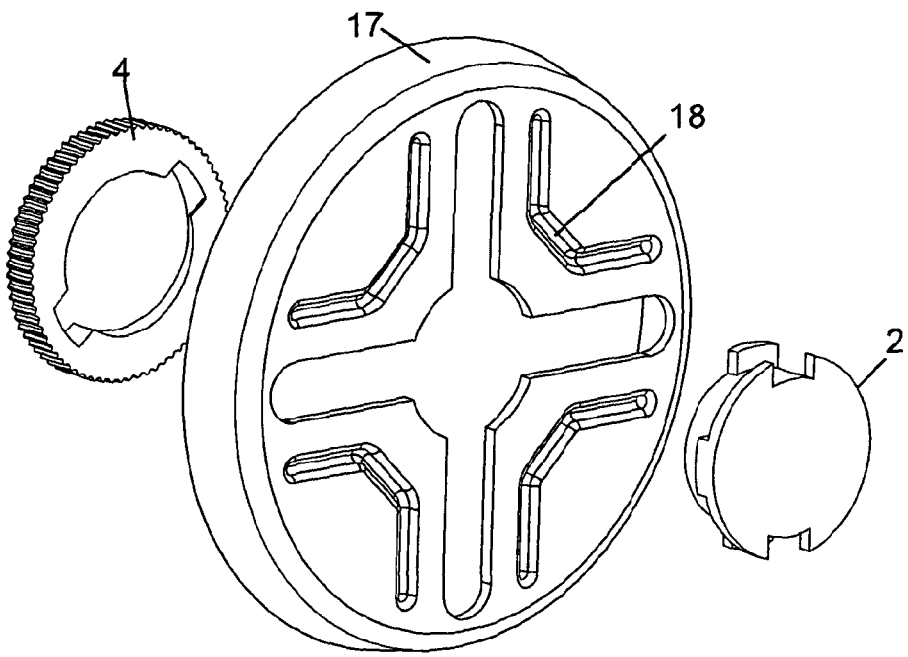
FIG. 3a shows a view of the components of FIG. 3 from the rear side.

FIG. 3 shows an alternative embodiment. The design and operation of the components are the same, with the first component 2 and the cam member 4 being identical to the ones shown in FIG. 2. However, in FIG. 3, the second component 17 is a pressed steel member. It has indented formations 18 which are provided to give stiffness and also to provide a receiving volume for second adhesive, as can be seen in FIG. 3a.

The method of the present invention is schematically illustrated with respect to FIG. 4-7. In these Figures, the mounting part is shown schematically, but will be according to FIGS. 1 and 2 or FIG. 3.

A wall 19 is selected for mounting a piece of furniture. The first component 2 is taken and the protective layer 20a which is formed on one adhesive surface of the double sided adhesive foam 20 is removed. The exposed adhesive surface is then used to fix the first component 2 at a selected position on the wall 19. Then, as shown in FIG. 5, a second adhesive is applied to the surface 12 of the second component. Suitably, the entire area of the first surface 12 is covered with adhesive. The second component is then placed over the first component 2 so that the latter projects through the opening 9 of the second component and so that the surface 12 is adjacent the wall 19. Then, as shown in FIG. 6, the cam member 4 is engaged with the projecting portion of the first component and rotated so that a compressive force is applied by the cam member and first component to the second component 3 so that the second component 3 is held securely against the wall while a bond is formed by the second adhesive to the wall.

Figure 7:
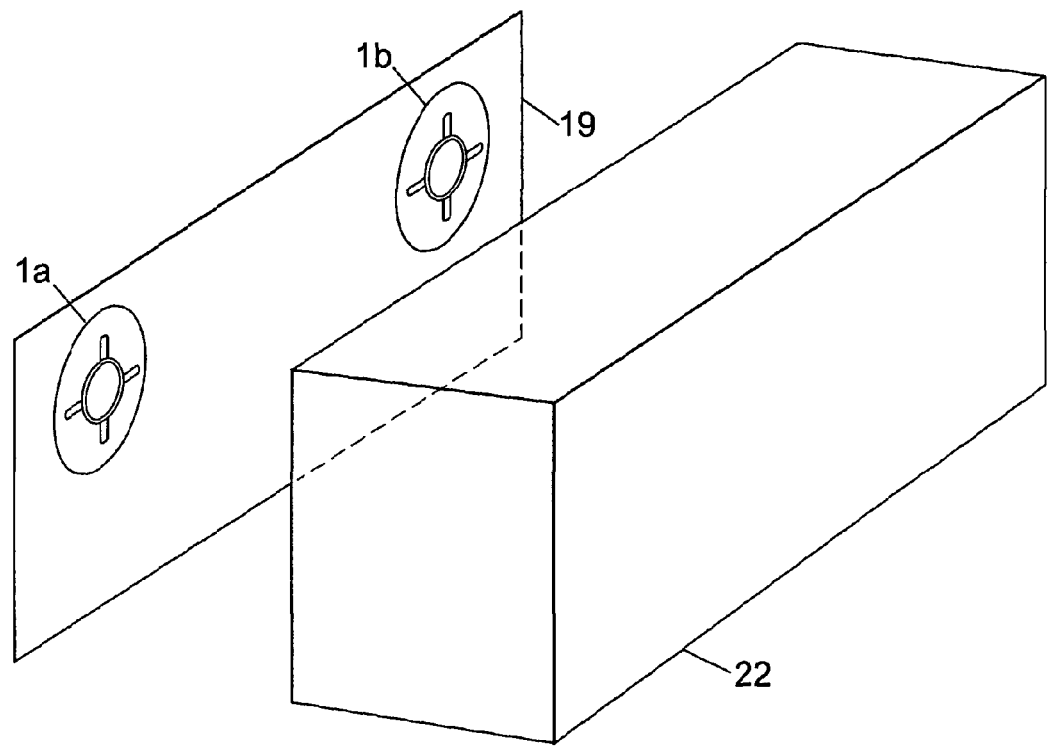

A second mounting part 16 may be mounted on the wall in exactly the same way. In order to ensure that the second mounting point part is completely level with the first mounting part 1a (as shown in FIG. 7), the first component of the second mounting part 1b, being relatively small and light can be held by an operator in the optimum position whilst using levelling apparatus such as a spirit level. When the second mounting part 1b has been fixed in place and the second adhesive has formed a strong bond, a piece of furniture 22 can be mounted on the first and second mounting parts 1a, 1b by any suitable means (not shown).

Figure 8:
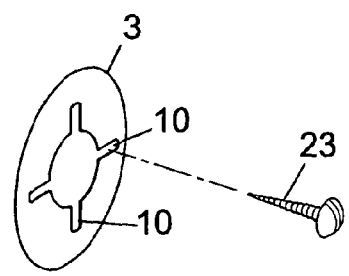
FIG. 8 is a schematic view of the mounting part of FIG. 1 or FIG. 3 being used with a screw.

As shown in FIG. 8, the user has the option, if the surface is deemed not suitable for use with adhesive, of rejecting the first component 2 and using only the second component 3 and fixing it in position by screwing it in place using at least one screw 23 passing through one of the slots 10. If an already existing screw hole is present in the wall, the screw 23 can be lined up with the screw hole and a selected point on either of the slots 10 can be selected for positioning the second mounting part 3 at the optimum position.

In accordance with the second aspect of the invention, the second component 3 can act as a mounting which can be screwed to a wall by screwing a screw through at least one of the slots 10 which cross one another substantially a right angle.

Figure 9:
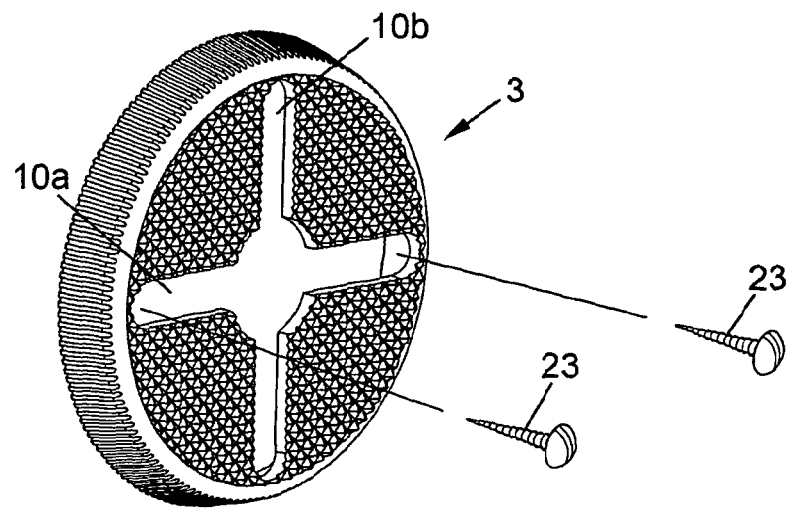
FIG. 9 is a schematic view of a mounting part according to the second aspect of the invention, engaged with two screws.

As shown in FIG. 9, in accordance with the second aspect of the invention, the second component, acting as a mounting part according to the second aspect of the invention, can be engaged with two screws 23. They are shown engaging opposite extremes of one of the slots 10a, but one screw 23 could be in a first slot 10a and the second screw could be in the second slot 10b.

Figure 10:
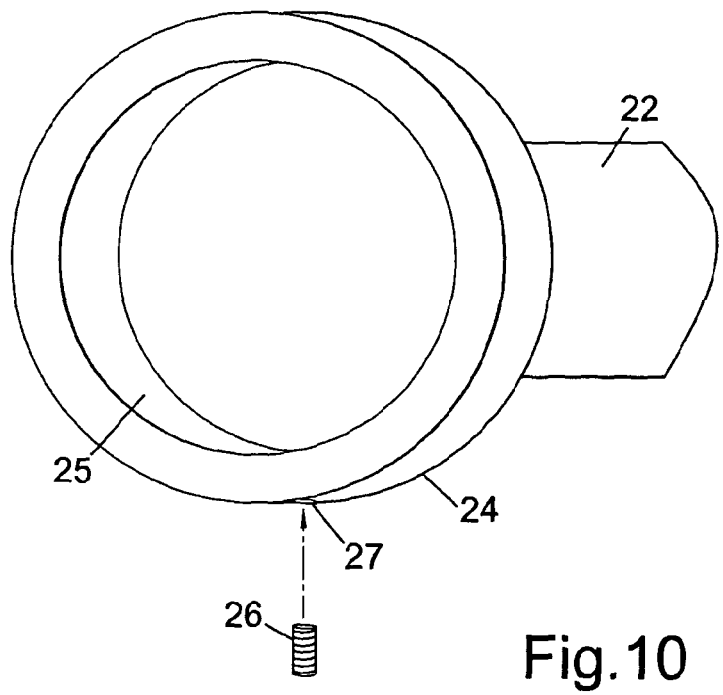
FIG. 10 shows a schematic view of an item of furniture for engagement with the mounting of the invention.

FIG. 10 is a schematic isometric view, from the rear, of an article of furniture to be mounted according to the present invention, It can be seen that it is generally circular in plan. It comprises a generally circular recess 25 in its rear face which is of size and form corresponding to the external profile of the second component 3. In use, the recess 25 can be placed over the second component 3, when the second component 3 has been fixed in position according to the first or second aspect of the invention. To further secure the article of furniture in place, a grub screw 26 may be engaged with screw threaded hole 27 in the item of furniture 24. The screw threaded hole 27 extends through the item of furniture into the recess 25. The grub screw can be screwed into the screw threaded hole 27 until it contacts the external periphery of the second component 3. There may be a corresponding hole in the periphery of the second component 3 into which the grub screw passes, or the grub screw may hold the article of furniture 24 in place by friction.

The article of furniture 24 is shown as a simple structure with a part for fixing on the second component 3 and a projection 27. For example, it may comprise a coat hook. Alternatively, the projection 27 may comprise formations for other uses, for example a towel holder, a toilet roll holder or amounting for another part of an item of furniture, for example a shelf. It may be a bracket.

Figure 11:
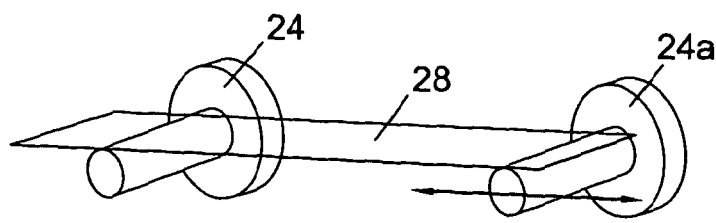
FIG. 11 is a schematic view of an item of furniture being engaged with two mountings according to the invention.

FIG. 11 shows a shelf 28 being mounted using two articles of furniture 24 in the form of brackets. It can be seen that, in accordance with the first and second aspects of the invention, at least one of the brackets 24a can be adjusted in a horizontal direction to obtain the desired support for the shelf 28.

Figure 12:
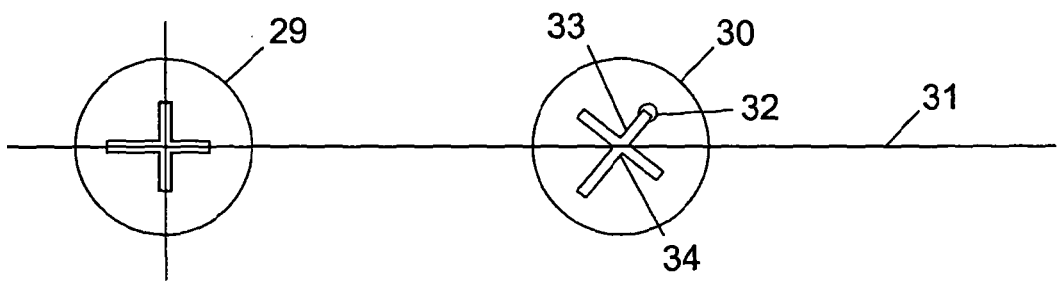
FIG. 12 is a schematic view of a method of adjusting the position of a mounting part in the method of mounting furniture according to the second aspect of the invention.

As can be seen in FIG. 12, according to the second aspect of the invention, two mounting parts 29 and 30 may be used to mount an item of furniture (not shown). FIG. 12 shows a notional horizontal line 31 and an already existing screw hole 32.

The notional horizontal line 31 indicates either a horizontal line through an existing screw hole to which the first mounting part 29 is to be fitted or a position determined by a user for an item of furniture. In this case, it can be seen that the second mounting part 30 can be aligned so that one of the slots 33 lies over the existing screw hole 32. The mounting part 30 has been rotated so that the centre point of the second mounting part 30 lies on the horizontal line 31, so that the two mounting parts 29 and 30 are correctly aligned. By arranging the second mounting part 30 so that the slot 33 is not precisely vertical, any tendency of the screw, when engaged, to slide down the slot 33 can be more effectively resisted. This shows how the mounting parts according to the second aspect of the invention are particularly flexible.

FIGS. 13-19 show various embodiments of mounting parts according to the second aspect of the invention.

Figure 13:
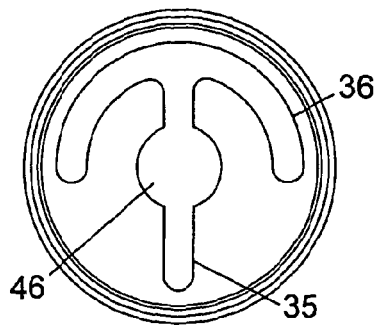
FIGS. 13-20 show different embodiments of mounting part according to the second aspect of the invention.
Figure 14:
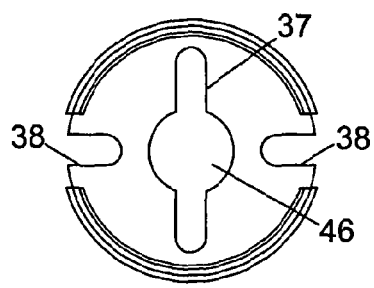

FIG. 13 shows a configuration resembling an anchor or a T may be provided. In this case, there is a first screw slot section 35 which meets a curved second screw slot section 36, substantially at a right angle. The second screw slot section 36 describes a section of circular arc, extending over an angular range of about 180°. FIG. 14 shows a straight screw slot extending in a central region of the mounting part, two screw holes 38 being provided, each in the form of a notch extending inwardly from a perimeter of the mounting part.

Figure 15:
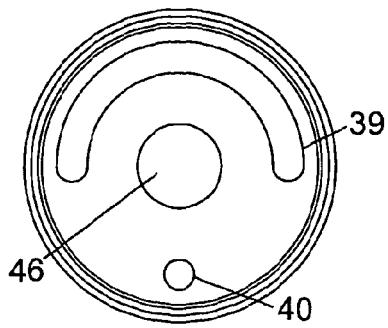
Figure 16:
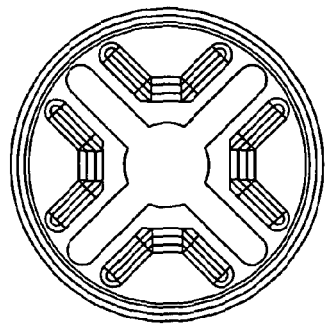

FIG. 15 shows a curved screw slot 39 in conjunction with a screw hole 40 which is substantially diametrically opposed to a central part of the screw slot 39. The mounting part is circular in plan and the circular arc of the screw slot 39 is concentric with the mounting part. FIG. 16 shows a mounting part which is substantially as shown in FIGS. 3 and 4.

Figure 17:
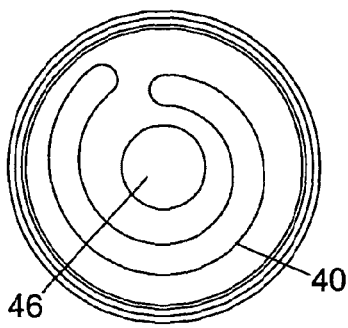
Figure 18:
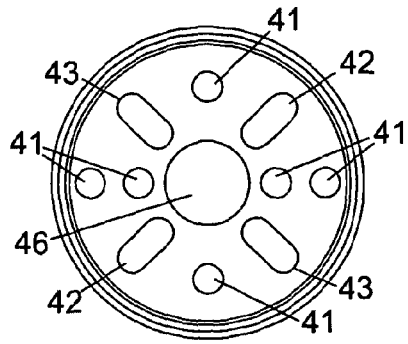
Figure 19:
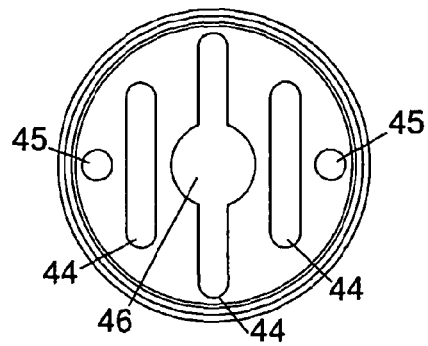
Figure 20:
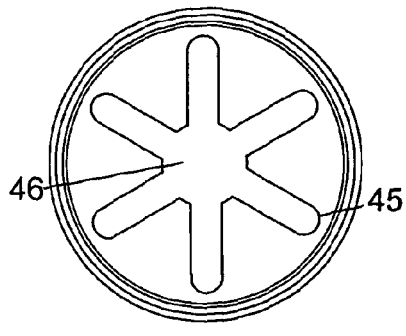

FIG. 17 shows a curved screw slot 39', extending over an angular range of about 270°. The mounting part is circular in plan and the curved slot 39' is generally spiral, centred on the centre of the mounting part. FIG. 18 shows a mounting part having six screw holes 41 arranged in a geometric pattern. There are preferably four screw slots 42, 43. The screw slots 42 are aligned with one another and the screw slots 43 are aligned with one another. FIG. 19 shows a plurality of screw slots 44 which extend substantially parallel to one another. Two screw holes 45 are provided. FIG. 20 shows a design with what may be seen as three slots 47 crossing one another.

In all of these cases, the mounting part comprises an aperture 46 for receiving a component 4 of the mounting part, according to the first aspect of the invention.

The present invention has been described above by way of example only. Modifications can be made within the invention. The invention consists in any individual features described herein or any generalisation of any such features or any combination of such features or any generalisation of such a combination of such features.

The invention claimed is:

1. A kit for assembling a mounting for mounting furniture to a wall, the kit comprising:
a mounting part,
having a first component, having a first adhesive receiving portion, and
a second component, having a second adhesive receiving portion,
a first adhesive for application to the first adhesive receiving portion,
a second adhesive for application to the second adhesive receiving portion,
wherein the first adhesive develops a bond to a wall more quickly than the second adhesive,
wherein the first component and the second component are releasably mountable with respect to one another, and
wherein the mounting part comprises at least two screw slots crossing one another at an angle for receiving at least one screw for fixing to a wall.

2. The kit according to claim 1, wherein the first component is mountable in an opening or recess of the second component.

3. The kit according to claim 1, wherein the second component has a first side, for placing adjacent a wall and a second side for facing away from the wall, the first component being mountable in an opening or recess of the second component which extends from the first side to the second side.

4. The kit according to claim 1, wherein the first component is configured to be releasably fixed with respect to the second component at a selectable position.

5. The kit according to claim 1, wherein the mounting part comprises:
a cam member, having a cam surface,
at least one of the first and second components having a cam surface whereby movement of the cam surfaces with respect to one another positions the first and second components at a selectable position.

6. The kit according to claim 5, wherein the cam member further comprises a bearing surface and the other of the first and second components has a bearing surface, whereby the cam member positions the first and second components with respect to one another by engagement of the cam surfaces and bearing surfaces.

7. The kit according to claim 5, wherein the cam member is rotatable with respect to the first and second components.

8. The kit according to claim 5, wherein the second component has a first side, for placing adjacent a wall and a second side for facing away from the wall, the first component being mountable in an opening of the second component which extends from the first side to the second side and the cam member is located adjacent the second side.

9. The kit according to claim 1, wherein the first adhesive comprises adhesive sheet material.

10. The kit according to claim 9, wherein the adhesive sheet material comprises a foam layer.

11. The kit according to claim 1, wherein the first adhesive comprises double sided adhesive sheet material and the first adhesive receiving portion comprises a surface for bonding to one side of the double sided adhesive sheet material.

12. The kit according to claim 1, wherein the first component is configured so that, when it is engaged with a wall, with a thickness of the first adhesive, the first component holds the second component at a distance in a range of 0.5 mm to 2 mm from the wall.

13. The kit according to claim 1, wherein the second adhesive receiving surface of the second component is textured or provided with formations for increasing the bond to the second adhesive.

14. The kit according to claim 1, wherein the second adhesive comprises a flowable composition in a container, for application to the second adhesive receiving portion.

15. The kit according to claim 14, wherein the second component has a first side, for placing adjacent a wall and a second side for facing away from the wall, the first component being mountable in an opening which extends from the first side to the second side, the opening being coincident with at least one screw hole or slot.

16. The kit according to claim 15, wherein the mounting part comprises two screw slots that cross at an angle, the opening being coincident with the crossing region of the slots.

17. The kit according to claim 1, wherein the mounting part comprises at least one screw hole or screw slot for receiving a screw for fixing to a wall.

18. A method of assembling a mounting for mounting furniture to a wall, comprising using the kit according to claim 1.

19. The method according to claim 18, wherein, in the kit used for assembling a mounting for mounting furniture to a wall, the second adhesive comprises a flowable composition in a container, for application to the second adhesive receiving portion, and further comprising the step of selecting the option of assembling the mounting by screwing at least one screw through the hole or slot to the wall.

20. A mounting for mounting furniture to a wall, assembled using the kit according to claim 1.

21. A method of assembling a mounting for mounting furniture to a wall, comprising the steps of:
 (i) providing a mounting part having a first component having a first portion adapted to receive adhesive, and a second component having a second portion adapted to receive,
 wherein the mounting part comprises at least two screw slots crossing one another at an angle for receiving at least one screw for fixing to a wall,
 (ii) selecting whether to use adhesive or a screw to fix the mounting part to the wall; wherein
 if use of adhesive is selected, the method further comprises the following steps (iii) to (v):
 (iii) applying a first adhesive to the first portion,
 (iv) applying a second adhesive to the second portion, and
 (v) placing the mounting part on a wall, wherein the first adhesive develops a bond to the wall more quickly than the second adhesive, and
 wherein the first component and the second component are mounted with respect to one another.

22. The method according to claim 21, wherein, in step (v), the first component is placed on the wall first, the second component being placed on the wall after the first component and so as to engage it.

23. The method according to claim 21, wherein, in step (v), the first component is mounted in an opening of the second component.

24. The method according to claim 21, wherein the second component has a first side and a second side, and in step (v), the first side is placed adjacent the wall and the second side is placed facing away from the wall, the first component being mounted in an opening which extends from the first side to the second side.

25. The method according to claim 21, wherein, in step (v), the first component is fixed with respect to the second component at a selectable position.

26. The method according to claim 21, wherein the mounting part comprises a cam member, having a cam surface, and at least one of the first and second components has a cam surface, and in step (v), the cam part is moved so that the cam surfaces position the first and second components at a selectable position.

27. The method according to claim 26, wherein the cam member further comprises a bearing surface and the other of the first and second components has a bearing surface, the cam part being moved so that the cam surfaces and the bearing surfaces position the first and second components at a selectable position.

28. The method according to claim 26, wherein the cam member is rotated with respect to the first and second components.

29. The method according to claim 26, wherein the second component has a first side, which is placed adjacent a wall and a second side which is positioned facing away from the wall, the first component being mounted in an opening of the second component which extends from the first side to the second side and the cam member being located adjacent the second side.

30. The method according to claim 21, wherein, in step (iii), the first adhesive comprises adhesive sheet material.

31. The method according to claim 30, wherein the adhesive sheet material comprises a foam layer.

32. A mounting for mounting furniture to a wall, assembled using the method of claim 31.

33. The method according to claim 21, wherein, in step (iii), the first adhesive comprises double sided adhesive sheet material and the first adhesive receiving portion comprises a surface bonded to one side of the double sided adhesive sheet material.

34. The method according to claim 33, wherein the double sided adhesive sheet material is bonded to the surface of the first adhesive receiving portion on one side, the other side having a peel-off sheet which is removed so that the double sided adhesive sheet material can be bonded to the wall.

35. The method according to claim 21, wherein, in step (iv), the second adhesive comprises a flowable composition in a container, which is applied to the second adhesive receiving portion.

36. A mounting for mounting furniture to a wall, comprising a mounting part for engaging the furniture and for fixing to a wall, the mounting part having:
 (a) at least two screw slots crossing or touching one another at an angle, for receiving at least one screw for fixing to a wall; and
 (b) at least one surface adapted to receive adhesive, wherein the mounting part comprises a structure engageable with a corresponding structure formed on furniture.

37. The mounting according to claim 36, wherein the at least two screw slots cross one another substantially at a right angle.

38. The mounting according to claim 36, wherein the mounting part comprises two releasably engageable components.

39. The mounting according to claim 38, wherein at least one of the components comprises the surface adapted to receive adhesive.

40. The mounting according to claim 39, wherein the adhesive comprises a double sided adhesive sheet.

41. The mounting according to claim 38, wherein a second of the two components has a first side, for placing adjacent a wall and a second side for facing away from the wall, and a first of the two components is mountable in an opening of a second component which extends from the first side to the second side.

42. The mounting according to claim 41, wherein the opening is coincident with a crossing region of the slots.

43. The mounting according to claim 36, wherein the mounting part is circular or at least partly circular in plan.

44. A method of mounting furniture to a wall having an already existing screw hole, comprising fixing to a wall a mounting part having at least two screw slots crossing or touching one another at an angle, or having at least one screw slot and at least one separate screw slot or fixed screw hole, by screwing a screw through at least one screw slot or screw hole into the existing screw hole, the mounting part further comprising at least one adhesive receiving surface, and the mounting part comprising a structure engageable with a corresponding structure formed on furniture, and mounting the furniture on the mounting part.

45. A method according to claim 44, comprising using a mounting comprising a mounting part for engaging the furniture and for fixing to a wall, the mounting part having:
 (a) at least two screw slots crossing or touching one another at an angle, for receiving at least one screw for fixing to a wall; or
 (b) at least one screw slot and at least one separate screw slot or fixed screw hole, for receiving at least one screw for fixing to a wall; or
 (c) at least one curved screw slot.

46. A method according to claim 44, comprising the step of adjusting the position of the screw with respect to the mounting part.

47. A method according to claim 44, comprising using at least two mounting parts.

48. A method according to claim 47, comprising adjusting the position of one mounting part with respect to a second mounting part, or with respect to the furniture, before fixing the said one mounting part.

49. A method according to claim 44, comprising screwing a first screw through a screw slot and screwing a second screw through the said screw slot or through a separate screw slot or screw hole.

50. A method according to claim 49, comprising the step of adjusting the mounting part after screwing the first screw through the said screw slot and before screwing the second screw through the said screw slot or through the separate screw slot or screw hole.

* * * * *